US010719181B2

(12) United States Patent
Peng

(10) Patent No.: US 10,719,181 B2
(45) Date of Patent: Jul. 21, 2020

(54) CAPACITIVE SINGLE LAYER MULTI-TOUCH PANEL HAVING IMPROVED RESPONSE CHARACTERISTICS

(71) Applicant: TEXAS INSTRUMENTS INCORPORATED, Dallas, TX (US)

(72) Inventor: Tao Peng, Carlsbad, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 85 days.

(21) Appl. No.: 16/017,108

(22) Filed: Jun. 25, 2018

(65) Prior Publication Data

US 2018/0307348 A1 Oct. 25, 2018

Related U.S. Application Data

(63) Continuation of application No. 13/872,448, filed on Apr. 29, 2013, now abandoned, which is a continuation of application No. PCT/CN2013/071011, filed on Jan. 28, 2013.

(51) Int. Cl.
*G06F 3/044* (2006.01)
(52) U.S. Cl.
CPC .................... *G06F 3/044* (2013.01)
(58) Field of Classification Search
CPC ........................................................ G06F 3/044
See application file for complete search history.

(56) References Cited

U.S. PATENT DOCUMENTS

| 4,237,421 | A | 12/1980 | Waldron |
| 6,188,391 | B1 | 2/2001 | Seely et al. |
| 7,714,847 | B2 | 5/2010 | Hsu et al. |
| 8,278,571 | B2 | 10/2012 | Orsley |
| 2006/0097991 | A1 | 5/2006 | Hotelling et al. |
| 2009/0091551 | A1 | 4/2009 | Hotelling et al. |
| 2010/0110041 | A1* | 5/2010 | Jang ...................... G06F 3/0412 345/174 |

(Continued)

FOREIGN PATENT DOCUMENTS

| CN | CN201218943 | 4/2009 |
| KR | 1020060086623 | 8/2006 |

(Continued)

*Primary Examiner* — Kent W Chang
*Assistant Examiner* — Chayce R Bibbee
(74) *Attorney, Agent, or Firm* — Michelle F. Murray; Charles A. Brill; Frank D. Cimino

(57) ABSTRACT

An apparatus is provided. A substrate and a cover plate are provided. A sensor layer is formed on at least one of the substrate and the cover plate. The sensor layer includes a plurality of row electrodes and a plurality of column electrodes interleaved with the plurality of row electrodes, where each row electrode and each column electrode is formed of a plurality of stair-stepped diamonds. An insulator is also included so as to electrically isolate the plurality of row electrodes and the plurality of column electrodes, where the insulator is substantially transparent to visible spectrum light. The apparatus employs mirror symmetric row sensor routing placement. The routing placement provides reduction of row bonding pads by 50% to enhance manufacturing yield. Rearranging unit cells on the same layout results in a decrease of RC parasitics by 50%.

20 Claims, 6 Drawing Sheets

(56) References Cited

U.S. PATENT DOCUMENTS

| | | |
|---|---|---|
| 2010/0149108 A1* | 6/2010 | Hotelling ............... G06F 3/044 345/173 |
| 2010/0156810 A1 | 6/2010 | Barbier et al. |
| 2010/0245285 A1 | 9/2010 | Wang et al. |
| 2010/0321326 A1 | 12/2010 | Grunthaner et al. |
| 2011/0095996 A1 | 4/2011 | Yimaz |
| 2011/0095997 A1 | 4/2011 | Philipp |
| 2011/0102361 A1 | 5/2011 | Philipp |
| 2011/0157079 A1 | 6/2011 | Wu et al. |
| 2012/0056664 A1 | 3/2012 | Nam |
| 2012/0075214 A1 | 3/2012 | Kim |
| 2013/0100041 A1* | 4/2013 | Golovchenko ......... G06F 3/044 345/173 |

FOREIGN PATENT DOCUMENTS

| | | |
|---|---|---|
| WO | 2009046363 | 4/2009 |
| WO | 2011018594 | 2/2011 |

\* cited by examiner

CAPACITIVE SINGLE LAYER MULTI-TOUCH PANEL HAVING IMPROVED RESPONSE CHARACTERISTICS

This application is a continuation of prior application Ser. No. 13/872,448, filed Apr. 29, 2013, currently pending, which is a continuation of PCT/CN2013/071011, filed Jan. 28, 2013, the entireties of which are incorporated herein by reference.

TECHNICAL FIELD

The invention relates generally to a touch panel and, more particularly, to a capacitive touch panel having an improved response.

BACKGROUND

Turning to FIGS. 1 and 2, an example of a conventional system 100 can be seen. System 100 generally comprises a touch panel 102 and touch panel controller 104. The touch panel 102 has an array of sensors formed by a set of column electrodes (e.g., electrode 103), where each electrode of each column is coupled together by a strip electrode (e.g., strip electrode 107), and a set of row electrodes (e.g., electrode 105), where each electrode of each row is coupled together by a strip electrode (e.g., strip electrode 109). Usually, the column and row electrodes (e.g., electrodes 103 and 105) are formed in two separate layers with a dielectric or insulating layer formed therebetween, and these conductive layers which form the electrodes (e.g., electrodes 105 and 109) are generally transparent to visible spectrum light (e.g., light having a wavelength from about 380 nm to about 750 nm). The strip electrodes for each column (e.g., strip electrode 107) are then coupled to the interface or I/F 106 of the touch panel controller 104 by terminals X-1 to X-N, while the strip electrodes for each row (e.g., strip electrode 109) are coupled to the interface 106 by terminals Y-1 to Y-M. The interface 106 is able to communicate with the control circuit 108. As shown in greater detail in FIG. 2, the interface 106 is generally comprised of a multiplexer or mux 202 and an exciter 204.

In operation, the interface 106 (which is usually controlled by the control circuit 108) selects and excites columns of electrodes (e.g., electrode 103) and "scans through" the rows of row electrodes (e.g., electrode 105) so that a touch position from a touch event can be resolved. As an example, interface 204 can excite two adjacent columns through terminals X-j and X-(j+1) with excitation signals EXCITE[j] and EXCITE[j+1], and interface 106 receives a measurement signal from a row associated with terminal Y-i. When an object (e.g., finger) is in proximity to the touch panel (which is generally considered to be a touch event), there is a change in capacitance due at least in part to the arrangement of electrodes (e.g., electrodes 103 and 105), and the controller 108 is able to resolve the position of the touch event.

Most conventional touch panels (e.g., touch panel 102) do, however, exhibit a non-uniform response characteristic, which is manifested as non-uniform signal strength across the panel. This non-uniformity is generally caused by natural variations in the patterns forming the column and row electrodes (e.g., electrodes 103 and 105). In other words, the electrodes are arranged to have gaps or non-overlapping regions between the electrodes so that, as an object (e.g., finger) traverses the panel (e.g., panel 102) and passes over these non-overlapping regions, the signal strength or measured capacitance changes. Therefore, there is a need for a touch panel having a more uniform response characteristic.

Some examples of other conventional systems are: U.S. Pat. Nos. 4,237,421; 6,188,391; U.S. Pat. No. 7,714,847; U.S.; U.S. Pat. No. 8,278,571; Patent Pre-Grant Publ. No. 2006/0097991; U.S. Patent Pre-Grant Publ. No. 2009/0091551; U.S. Patent Pre-Grant Publ. No. 2010/0149108; U.S. Patent Pre-Grant Publ. No. 2010/0156810; U.S. Patent Pre-Grant Publ. No. 2010/0321326; U.S. Patent Pre-Grant Publ. No. 2011/0095996; U.S. Patent Pre-Grant Publ. No. 2011/0095997; U.S. Patent Pre-Grant Publ. No. 2011/0102361; U.S. Patent Pre-Grant Publ. No. 2011/0157079; U.S. Patent Pre-Grant Publ. No. 2012/0056664; PCT Publ. No. WO2009046363; and PCT Publ. No. WO2011018594.

SUMMARY

An embodiment of the present invention, accordingly, provides an apparatus comprising: a substrate; a cover plate that is substantially transparent to visible spectrum light; a sensor layer formed on at least one of the substrates and the cover plate, wherein the sensor layer includes: a plurality of row electrodes; a plurality of column electrodes interleaved with the plurality of row electrodes, wherein the intersections of each row electrode and each column electrode are arrayed in a logical array defined to reduce parasitic capacitance and resistance; traces formed in the single layer electrically connected to each of the row and column electrodes; and a board configured for attaching to the substrate, the board including vias and routing that provide an equivalent of electrical crossovers to electrically connect each of the electrodes in a row to one another while providing electrical isolation from row electrodes and traces associate with other rows.

In accordance with the present invention, the conductive layer is formed on the cover plate.

In accordance with the present invention, the conductive layer is formed on the substrate.

In accordance with the present invention, the first and second columns of electrodes are horizontal mirror images of one another, the third and forth columns of electrodes are horizontal mirror images of one another and continuing on with columns n-1 and n being horizontal images of one another to complete the column layout in the array.

In accordance with the present invention, the intersections of each row electrode of the row of electrodes with the first and second columns of electrodes is a vertical mirror image of the row of electrodes that intersect with third and fourth columns of electrodes and continuing on with alternating rows with alternating mirrored pairs of columns of electrodes.

In accordance with the present invention, each of the interleaved pairs of columns and rows is formed of a single conductive trace.

In accordance with the present invention, the single conductive trace is substantially transparent to visible spectrum light.

In accordance with the present invention, an insulator that electrically isolates the plurality of row electrodes and the plurality of column electrodes is substantially transparent to visible spectrum light.

An embodiment of the present invention, accordingly, provides an apparatus comprising: a touch panel having: a substrate; a cover plate that is substantially transparent to visible spectrum light; a sensor layer formed on at least one of the substrates and the cover plate, wherein the sensor layer includes: a plurality of row electrodes; a plurality of column electrodes interleaved with the plurality of row electrodes, wherein the intersections of each row electrode and each column electrode are arrayed in a logical array defined to reduce parasitic capacitance and resistance; and an insulator that electrically isolates the plurality of row electrodes and the plurality of column electrodes, wherein the insulator is substantially transparent to visible spectrum light; traces formed in the single layer electrically connected to each of the row and column electrodes; a board configured for attaching to the substrate, the board including vias and routing that provide an equivalent of electrical crossovers to electrically connect each of the electrodes in a row to one another while providing electrical isolation from row electrodes and traces associate with other rows; an interconnect that is coupled to each row electrode and each column electrode; and a touch panel controller that is coupled to the interconnect.

In accordance with the present invention, the conductive layer is formed on the cover plate.

In accordance with the present invention, the conductive layer is formed on the substrate.

In accordance with the present invention, the first and second columns of electrodes are horizontal mirror images of one another, the third and forth columns of electrodes are horizontal mirror images of one another and continuing on with columns n-1 and n being horizontal images of one another to complete the column layout in the array.

In accordance with the present invention, the intersections of each row electrode of the row of electrodes with the first and second columns of electrodes is a vertical mirror image of the row of electrodes that intersect with third and fourth columns of electrodes and continuing on with alternating rows with alternating mirrored pairs of columns of electrodes.

In accordance with the present invention, each of the interleaved pairs of columns and rows is formed of a single conductive trace.

In accordance with the present invention, the single conductive trace is substantially transparent to visible spectrum light.

In accordance with the present invention, an insulator that electrically isolates the plurality of row electrodes and the plurality of column electrodes is substantially transparent to visible spectrum light.

In accordance with the present invention, the touch panel is coupled to the board.

An embodiment of the present invention, accordingly, provides an apparatus comprising: a touch panel having: a display; a substrate that is secured to the display, wherein the substrate is substantially transparent to visible spectrum light; a sensor layer formed over the substrate, wherein the sensor layer includes: a plurality of row electrodes formed over the substrate; a plurality of column electrodes formed over the substrate, wherein each column electrode is interleaved with the plurality of row electrodes, wherein the intersections of each row electrode and each column electrode are arrayed in a logical array defined to reduce parasitic capacitance and resistance; and a first insulator that is formed over the substrate and the sensor layer, wherein the first insulator is substantially transparent to visible spectrum light, and wherein the first insulator electrically isolates the plurality of row electrodes and the plurality of column electrodes; a cover plate that is secured to the first insulator layer, wherein the cover plate is substantially transparent to visible spectrum light; an interconnect that is coupled to each column electrode and each row electrode; and a touch panel controller having: an interface that is coupled to the interconnect; and a control circuit that is coupled to the interface.

In accordance with the present invention, each the plurality of row electrodes and column electrodes is formed of a conductive trace.

In accordance with the present invention, the plurality of row electrodes, the plurality of column electrodes, and the plurality of bridge conductors are formed of indium tin oxide (ITO).

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
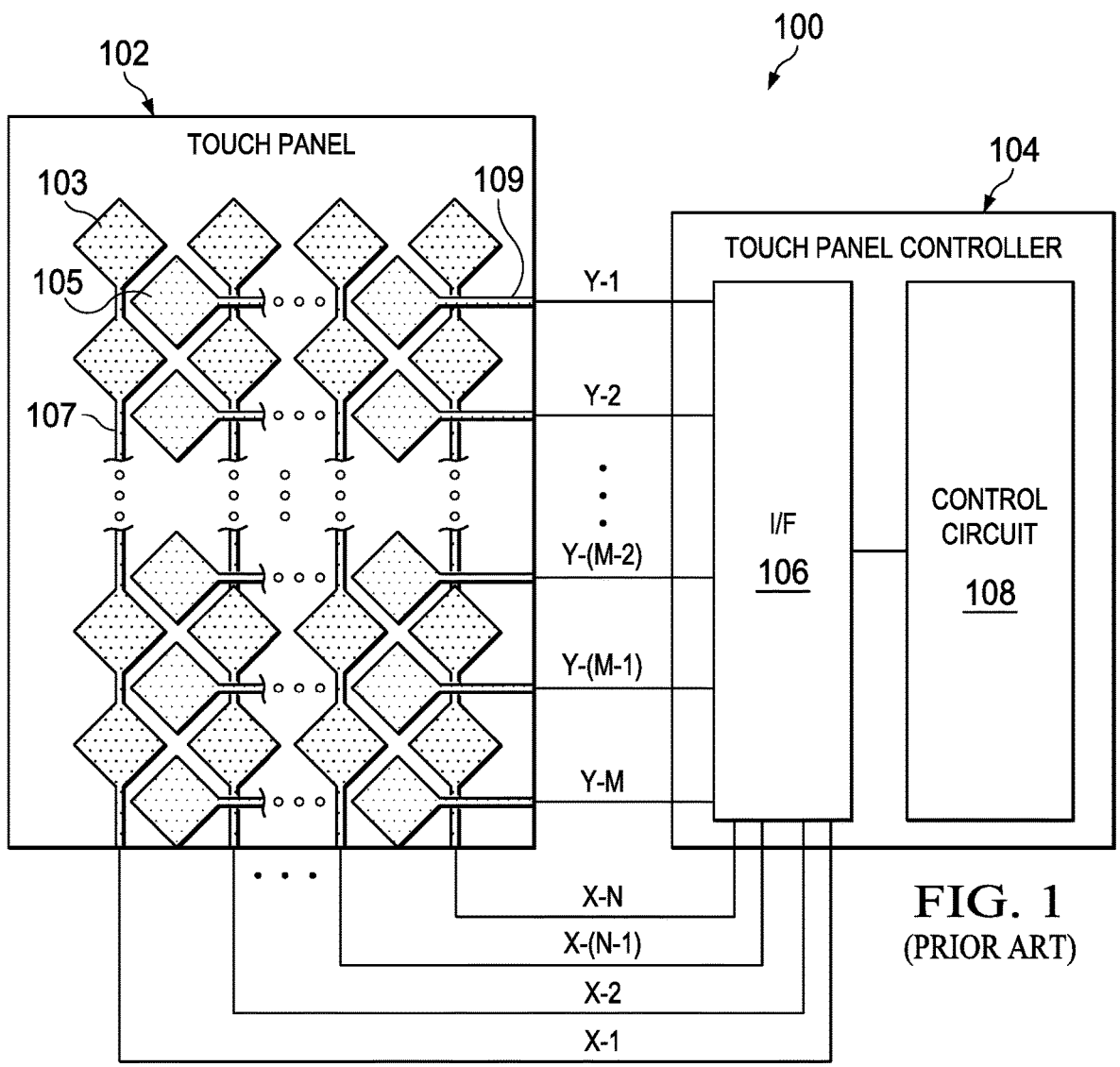
FIGS. 1 and 2 are diagrams of an example of a conventional system.
Figure 2:
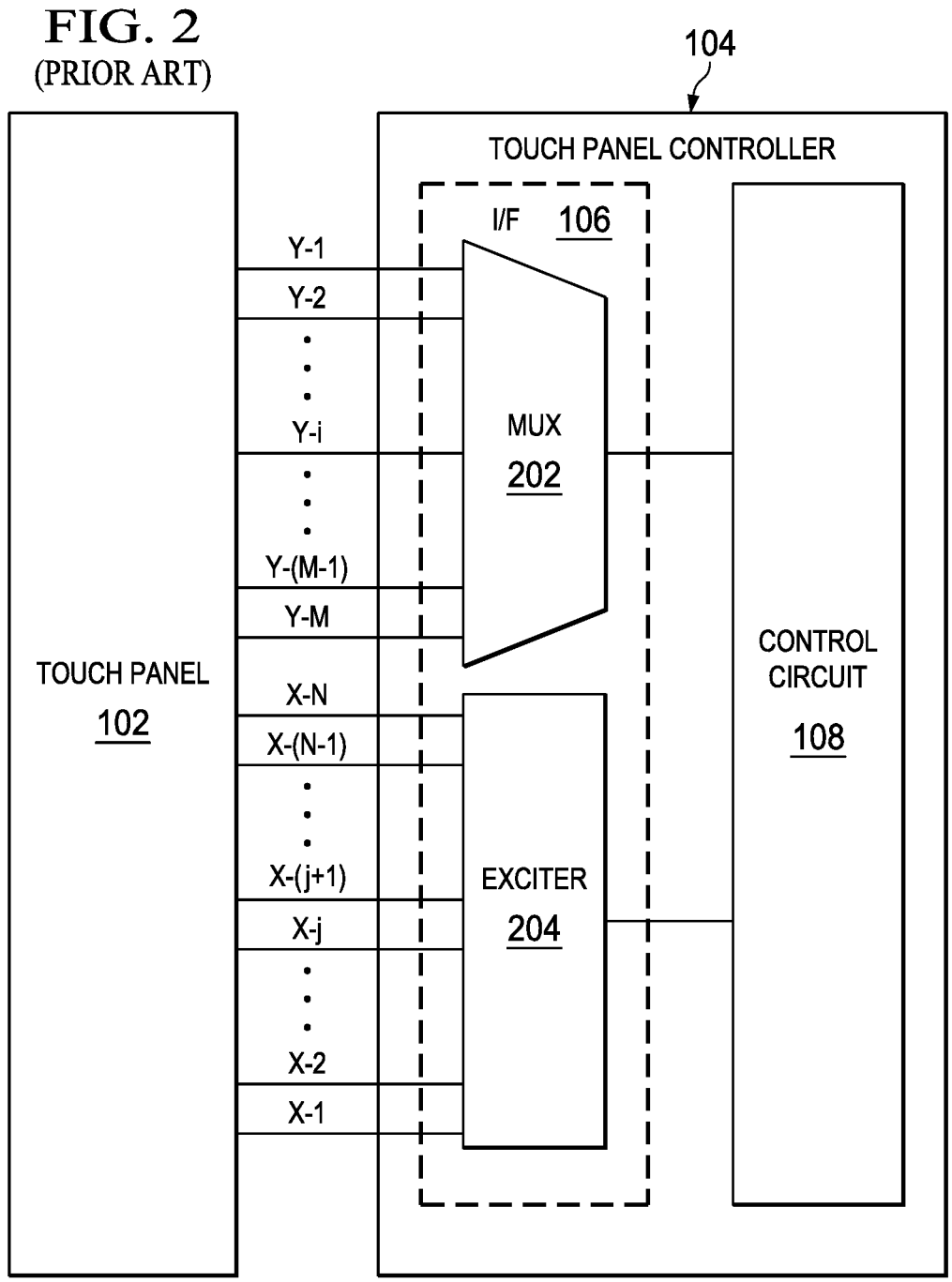

Refer now to the drawings wherein depicted elements are, for the sake of clarity, not necessarily shown to scale and wherein like or similar elements are designated by the same reference numeral through the several views.

Figure 3:
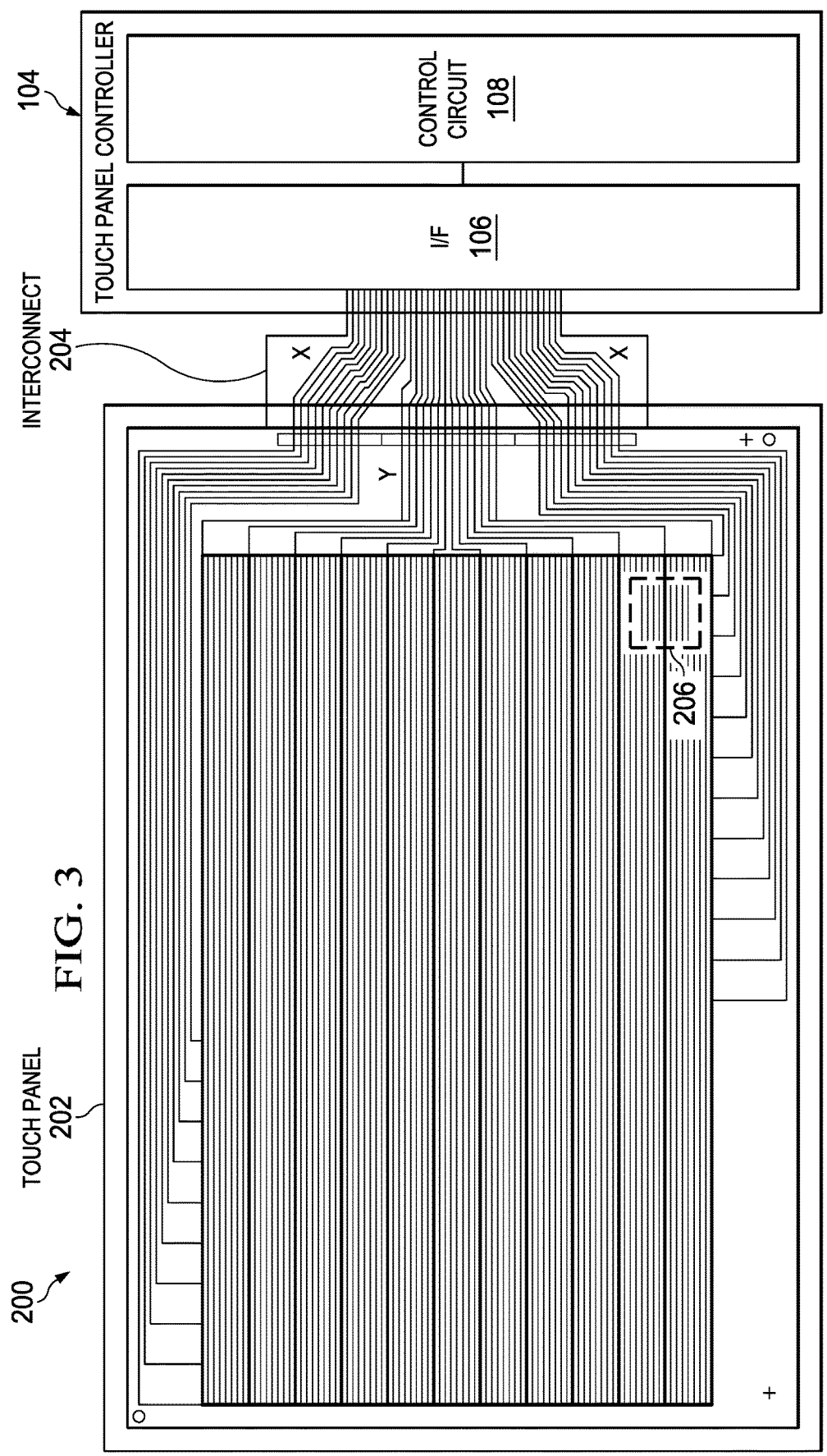
FIG. 3 is diagrams of an example of a system in accordance with the present invention.

Turning to FIG. 3, an example of a system 200 in accordance with the present invention can be seen. System 200 is similar in construction to system 100 except that touch panel 102 has been replaced by touch panel 202. Additionally, interconnect 204 has been provided to provide communication channels between the touch panel controller 104 and the touch panel 202.

Figure 4:
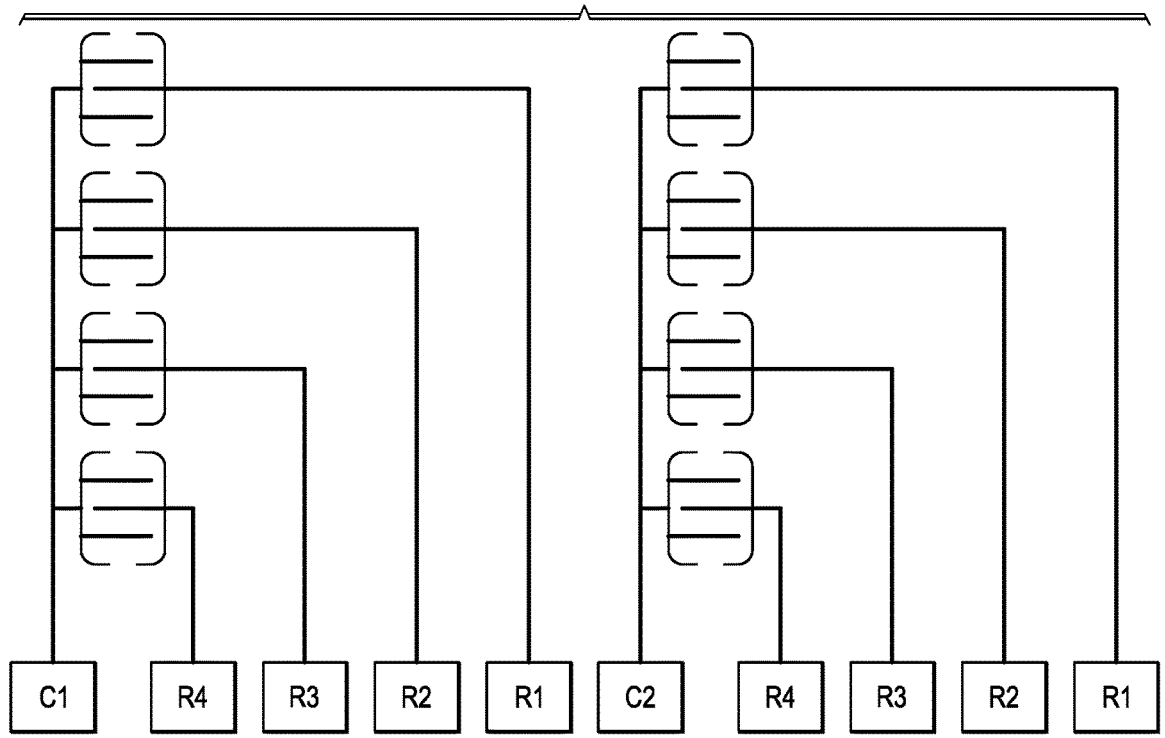
FIG. 4 is an example of a conventional single layer portion of a touch panel of FIG. 3.

In FIG. 4, a 4 row by 2 column portion of conventional single layer touch panel can be seen. As shown in this example, the touch panel is generally comprised of a touch sensor disposed over or positioned over a display (which can, for example be a liquid crystal display or LCD) so as to allow the light from the display to project through the sensor. This means that each trace of the layer sensor is substantially transparent to visible spectrum light. As shown, the touch sensor is a single layer sensor, having rows R1, R2, R3 and R4 and columns C1 and C2. The column and row traces, in this example, each have a conductive layer disposed on a substrate. Typically, the substrate is formed of glass (which is substantially transparent to visible spectrum light), and the conductive layer is usually formed of a conductive material that is generally transparent to visible spectrum light (such as indium tin oxide, aluminum doped zinc oxide, gallium doped zinc oxide, or indium doped zinc oxide). The conductive layer is usually formed by electron beam evaporation, physical vapor deposition (PVD), or sputter deposition on the substrate, which can, for example, then be patterned using laser ablation or etching so to form the detection electrodes. The sensor layers can then be secured to the cover plate, using an insulating or dielectric material (which can be an adhesive, like epoxy).

Figure 5:
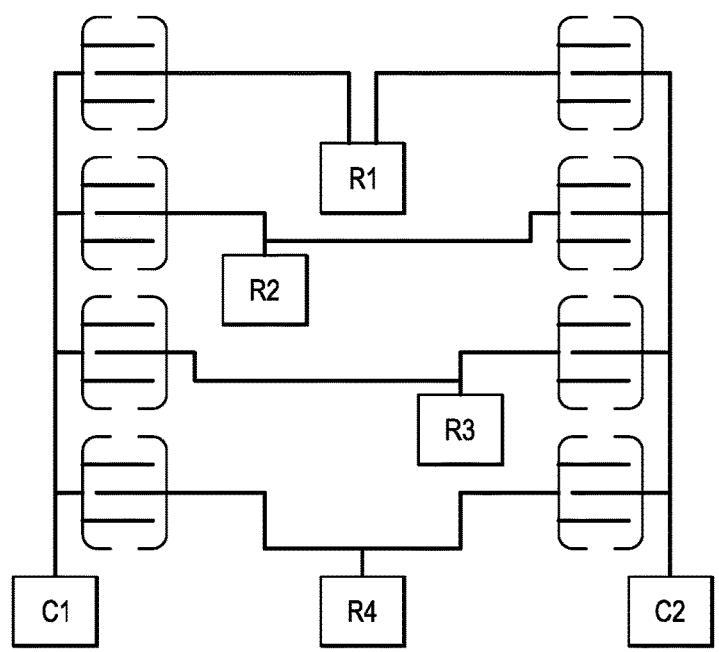
FIG. 5 is an example of layout of optimized to reduce the number of row bonding pads.
Figure 6:
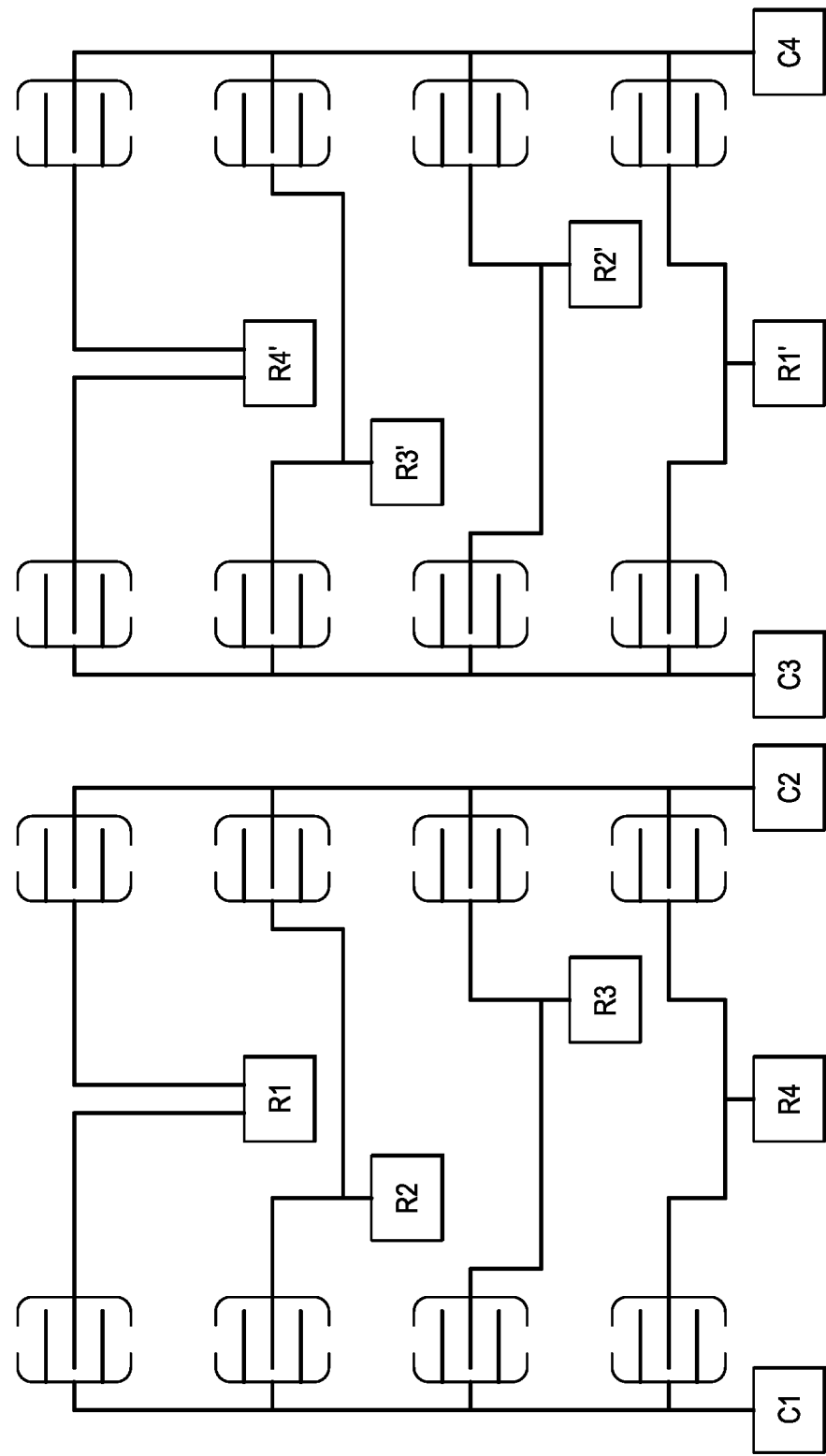
FIG. 6 is a physical layout of a portion of a touch panel in accordance with the present invention.

In order to achieve a more uniform response characteristic for the touch sensor, the patterns for the conductors should be modified. As shown in the example of FIGS. 5 and 6, row and column traces are interleaved across the touch sensor. The interleaving can vary in configuration based on the logical arrangement of the conductors but are intended to reduce the size, parasitic resistance and capacitance (and, thus, the impact) of the array and produce a generally uniform response characteristic across the touch sensor.

Figure 7:
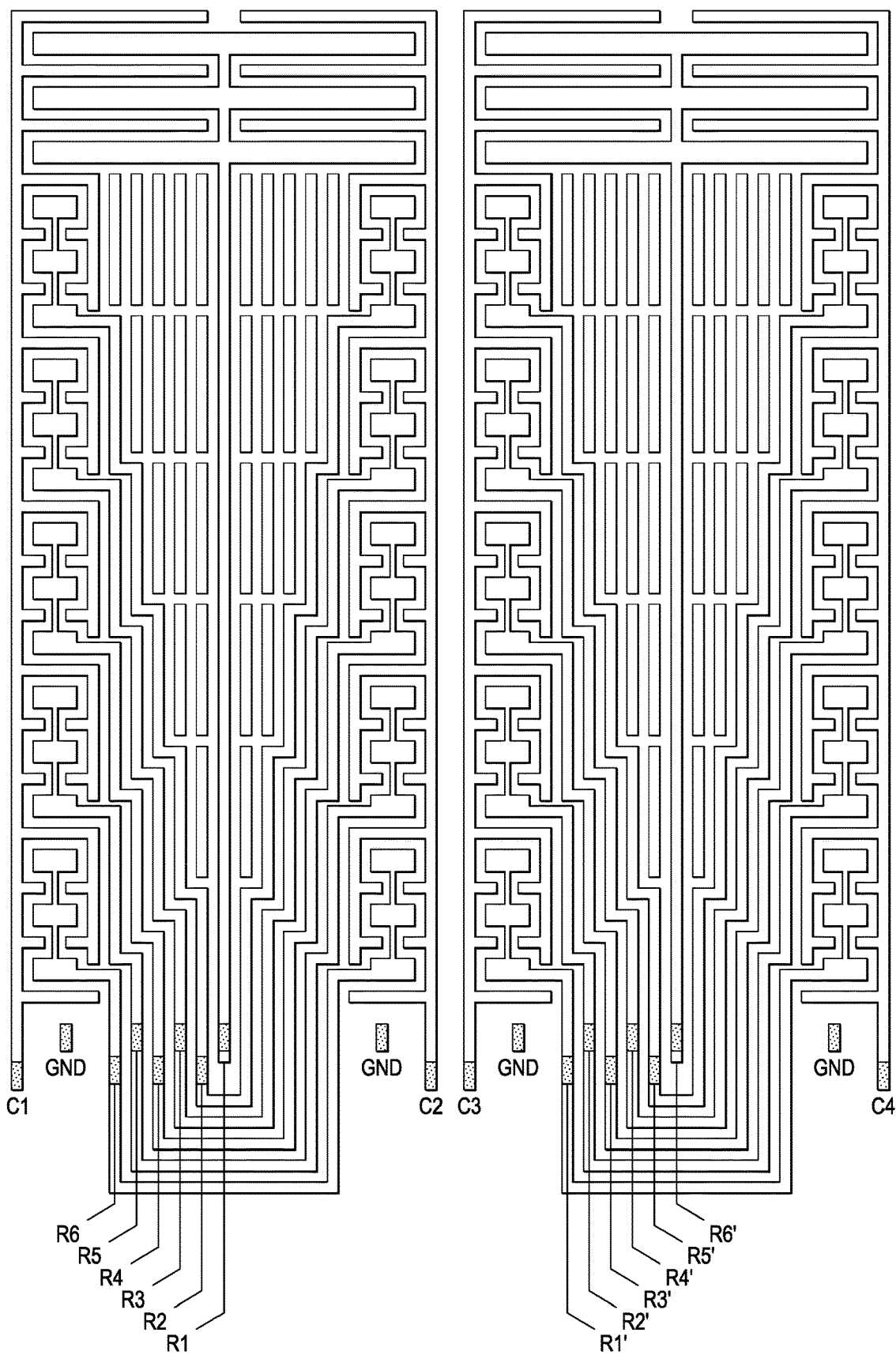
FIG. 7 depicts an example an actual layout of a 6 row by 4 column touchpad.

In FIGS. 6 and 7, examples of configurations for the row and column logical arrangements are shown. In FIG. 6, the far and end rows have been shuffled to reduce RC loading. The shuffling is de-shuffled in digital processing in the control circuit 108 of the touch panel controller 104. In this example, electrode of row R1 associated with column C1 and column C2 has the longest routing trace which can be 30 kilohms or higher. Parasitic fringing capacitance of row R1 resulted from coupling with its neighbor hood rows are also the largest of all. However, both R and C come down to minimum for logical row R1' associated with column C3 and column C4. Following the same arrangement row R2 in column C1 and column C2 is shuffled from the high RC scenario down to low RC scenario in column C3 and column C4. By placing the columns in a mirror symmetric manner as shown in FIG. 6, the bonding pads on the rows are reduced by 50%. FIG. 7 shows and exemplary layout of a 6 row by 4 column touch pad as disclosed in this invention.

As a result of using the configurations shown in FIGS. 6 and 7, several advantages can be realized. One advantage is that the touch panel has a more uniform response characteristic because of the reduction in parasitic capacitance and resistance (the worst case RC is reduced by 50%). Also, because the touch panel in the present invention is a true single metal configuration, where bonding failure is a major manufacturing bottleneck, yield due to reduced bonding pad count is enhanced and thus processing cost is reduced.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. An apparatus comprising:
   a touch panel comprising:
      a sensor layer comprising:
         a first sensor in a first column and a first physical row, the first sensor comprising:
            a first column electrode; and
            a first row electrode;
         a second sensor in a second column and the first physical row, the second sensor comprising:
            a second column electrode; and
            a second row electrode coupled to the first row electrode;
         a third sensor in a third column and a second physical row, wherein the second physical row is different than the first physical row, the third sensor comprising:
            a third column electrode; and
            a third row electrode; and
         a fourth sensor in a fourth column and the second physical row, the fourth sensor comprising:
            a fourth column electrode; and
            a fourth row electrode coupled to the third row electrode;
   a touch panel controller comprising a control circuit; and
   interconnect coupling the touch panel to the touch panel controller; and
   wherein the control circuit is configured to assign the first row electrode, the second row electrode, the third row electrode, and the fourth row electrode in a first logical row.

2. The apparatus of claim 1, wherein the first row electrode, the second row electrode, the third row electrode, and the fourth row electrode are in a first layer, wherein the first column electrode, the second column electrode, the third column electrode, and the fourth column electrode are in a second layer, and wherein a substantially transparent insulator is disposed between the first layer and the second layer.

3. The apparatus of claim 1, wherein the touch panel controller further comprises an interface (I/F) controlled by the control circuit, the I/F comprising;
   an exciter configured to scan through the first physical row and the second physical row; and
   a multiplexer.

4. The apparatus of claim 1, wherein the control circuit is configured to detect a finger in proximity to the touch panel.

5. The apparatus of claim 1, wherein the sensor layer is symmetric, wherein the first column is a mirror image of the fourth column and the second column is a mirror image of the third column.

6. The apparatus of claim 1, wherein the touch panel further comprises:
   a substantially transparent substrate; and
   a conductive layer disposed on the substantially transparent substrate.

7. An apparatus comprising:
   a touch panel comprising:
      a sensor layer comprising:
         a first sensor in a first column and a first physical row, the first sensor comprising:
            a first column electrode; and
            a first row electrode;
         a second sensor in a second column and the first physical row, the second sensor comprising:
            a second column electrode; and
            a second row electrode coupled to the first row electrode;
         a third sensor in a third column and a second physical row, wherein the second physical row is different than the first physical row, the third sensor comprising:
            a third column electrode; and
            a third row electrode; and
         a fourth sensor in a fourth column and the second physical row, the fourth sensor comprising:
            a fourth column electrode; and
            a fourth row electrode coupled to the third row electrode;
   a touch panel controller comprising a control circuit, wherein the sensor layer comprises a plurality of traces in a single layer, the plurality of traces connected to the first row electrode, the second row electrode, the third row electrode, the fourth row electrode, the first column electrode, the second column electrode, the third row electrode, and the fourth row electrode;
   interconnect coupling the touch panel to the touch panel controller, wherein the interconnect is coupled to the plurality of traces; and wherein the control circuit is configured to assign the first row electrode, the second row electrode, the third row electrode, and the fourth row electrode in a first logical row.

8. The apparatus of claim 7, wherein the sensor layer is symmetric, wherein the first column is a mirror image of the fourth column, the second column is a mirror image of the third column, and the plurality of traces is symmetric across a mirror plane.

9. The apparatus of claim 8, wherein the plurality of traces is interleaved across the touch panel.

10. The apparatus of claim 7, wherein the touch panel further comprises:
 a substantially transparent substrate; and
 a conductive layer disposed on the substantially transparent substrate, wherein the conductive layer comprises the plurality of traces.

11. The apparatus of claim 10, wherein the touch panel further comprises a cover plate coupled between the substantially transparent substrate and the conductive layer.

12. The apparatus of claim 10, wherein the conductive layer comprises indium tin oxide, aluminum doped zinc oxide, gallium doped zinc oxide, or indium doped zinc oxide.

13. The apparatus of claim 10, wherein the touch panel further comprises a display coupled to the substantially transparent substrate.

14. An apparatus comprising:
 a touch panel comprising:
  a sensor layer comprising:
   a first sensor in a first column and a first physical row, the first sensor comprising:
    a first column electrode; and
    a first row electrode;
   a second sensor in a second column and the first physical row, the second sensor comprising:
    a second column electrode; and
    a second row electrode coupled to the first row electrode;
   a third sensor in a third column and a second physical row, wherein the second physical row is different than the first physical row, the third sensor comprising:
    a third column electrode; and
    a third row electrode; and
   a fourth sensor in a fourth column and the second physical row, the fourth sensor comprising:
    a fourth column electrode; and
    a fourth row electrode coupled to the third row electrode;
   a fifth sensor in the first column and the second physical row, the fifth sensor comprising:
    a fifth column electrode coupled to the first column electrode; and
    a fifth row electrode;
   a sixth sensor in the second column and the second physical row, the sixth sensor comprising:
    a sixth column electrode coupled to the second column electrode; and
    a sixth row electrode coupled to the fifth row electrode;
   a seventh sensor in the third column and the first physical row, the seventh sensor comprising:
    a seventh column electrode coupled to the third column electrode; and
    a seventh row electrode; and
   an eighth sensor in the fourth column and the first physical row, the eighth sensor comprising:
    an eighth column electrode coupled to the fourth column electrode; and
    an eighth row electrode coupled to the seventh row electrode.

15. The apparatus of claim 14, further comprising a control circuit configured to:
 assign the first row electrode, the second row electrode, the third row electrode, and the fourth row electrode in a first logical row; and
 assign the fifth row electrode, the sixth row electrode, the seventh row electrode, and the eighth row electrode in a second logical row, wherein the second logical row is different than the first logical row.

16. The apparatus of claim 15, wherein the sensor layer further comprises:
 a ninth sensor in the first column and a third physical row, the ninth sensor comprising:
  a ninth column electrode coupled to the first column electrode and the fifth column electrode; and
  a ninth row electrode;
 a tenth sensor in the second column and the third physical row, the tenth sensor comprising:
  a tenth column electrode coupled to the second column electrode and the sixth column electrode; and
  a tenth row electrode coupled to the ninth row electrode;
 an eleventh sensor in the third column and a fourth physical row, the eleventh sensor comprising:
  an eleventh column electrode coupled to the third column electrode and the third column electrode; and
  an eleventh row electrode; and
 a twelfth sensor in the fourth column and the fourth physical row, the twelfth sensor comprising:
  a twelfth column electrode coupled to the eight column electrode and the fourth column electrode; and
  a twelfth row electrode coupled to the eleventh row electrode.

17. The apparatus of claim 16, the sensor layer comprising:
 a thirteenth sensor in the first column and the fourth physical row, the thirteenth sensor comprising:
  a thirteenth column electrode coupled to the first column electrode, the ninth column electrode, and the fifth column electrode; and
  a thirteenth row electrode;
 a fourteenth sensor in the second column and the fourth physical row, the fourteenth sensor comprising:
  a fourteenth column electrode coupled to the second column electrode, the tenth column electrode, and the sixth column electrode; and
  a fourteenth row electrode coupled to the thirteenth row electrode;
 a fifteenth sensor in the third column and the third physical row, the fifteenth sensor comprising:
  a fifteenth column electrode coupled to the third column electrode, the eleventh column electrode, and the third column electrode; and
  a fifteenth row electrode; and
 a sixteenth sensor in the fourth column and the third physical row, the sixteenth sensor comprising:
  a sixteenth column electrode coupled to the fourth column electrode, the twelfth column electrode, and the fourth column electrode; and
  a sixteenth row electrode coupled to the fifteenth row electrode.

18. The apparatus of claim 17, wherein the control circuit is configured to:
assign the ninth row electrode, the tenth row electrode, the eleventh row electrode, and the twelfth row electrode in a third logical row; and
assign the thirteenth row electrode, the fourteenth row electrode, the fifteenth row electrode, and the sixteenth row electrode in a fourth logical row, wherein the third logical row is different than the fourth logical row.

19. The apparatus of claim 17, wherein the first sensor, the second sensor, the third sensor, the fourth sensor, the fifth sensor, the sixth sensor, the seventh sensor, the eighth sensor, the ninth sensor, the tenth sensor, the eleventh sensor, the twelfth sensor, the thirteenth sensor, the fourteenth sensor, the fifteenth sensor, and the sixteenth sensor are stair-stepped diamonds.

20. The apparatus of claim 14, further comprising:
a touch panel controller comprising a control circuit; and
interconnect coupling the touch panel to the touch panel controller; and
wherein the control circuit is configured to assign the first row electrode, the second row electrode, the third row electrode, and the fourth row electrode in a first logical row.

* * * * *